Oct. 25, 1955 E. M. HILL 2,721,586
POWER OPERATED RECIPROCATING BLADE HANDSAW
Filed Aug. 13, 1954 2 Sheets-Sheet 1
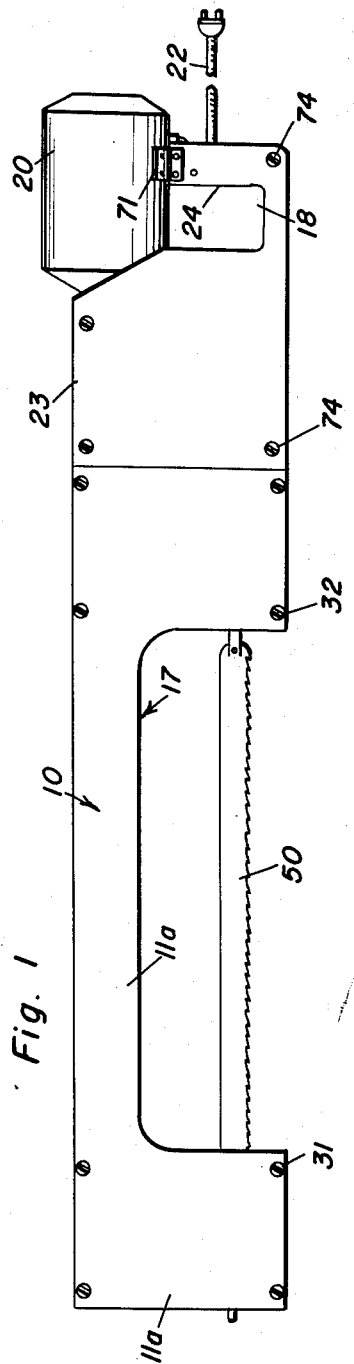
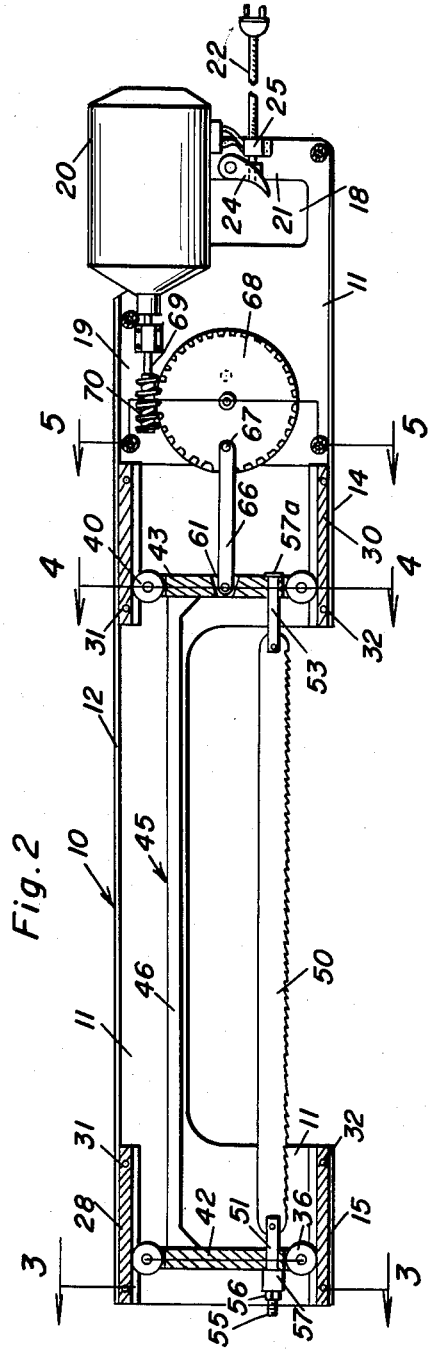
Edward M. Hill INVENTOR.
BY *Clarence A. O'Brien*
*and Harvey B. Jackson*
Attorneys Oct. 25, 1955      E. M. HILL      2,721,586
POWER OPERATED RECIPROCATING BLADE HANDSAW
Filed Aug. 13, 1954      2 Sheets—Sheet 2
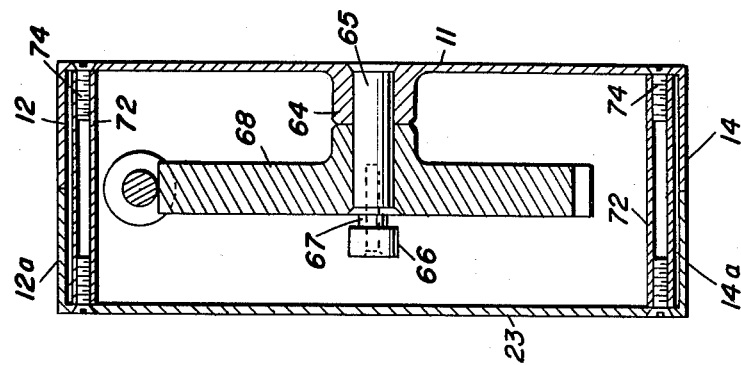
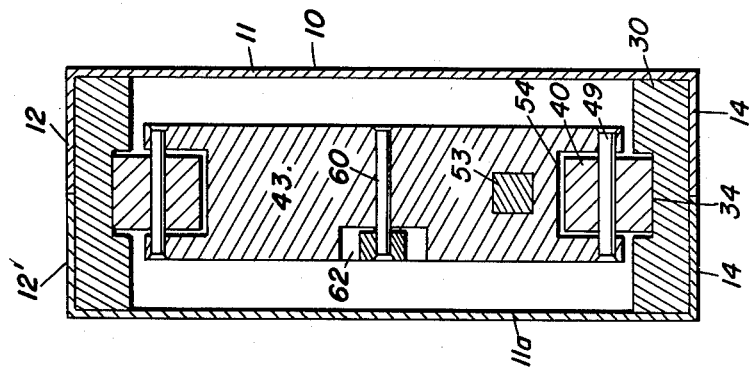
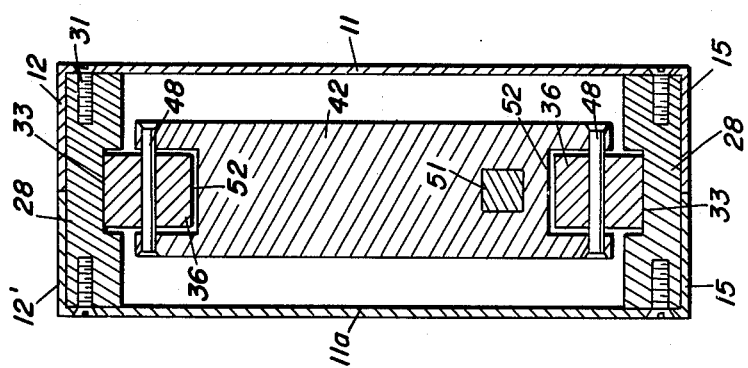
Edward M. Hill
INVENTOR.

United States Patent Office 2,721,586
Patented Oct. 25, 1955

2,721,586

POWER OPERATED RECRIPROCATING BLADE HANDSAW

Edward M. Hill, Stockton, Calif., assignor of fifty per cent to Alvin E. Reinking, Medford, Oreg.

Application August 13, 1954, Serial No. 449,620

7 Claims. (Cl. 143—68)

This invention relates to power operated saws and especially to portable hacksaws the blade of which is reciprocated by an electric motor.

The primary object of the invention is to provide a manually operated saw of this type which is supported and guided by hand while the hacksaw is provided with self contained electric power mechanism operating the blade of the manually guided saw.

Another object of the invention consists in providing a construction of this type which is safely manipulated and easily controlled and which is reciprocated with very little friction, so that the size of the electric motor is reduced to a minimum consistent with the job to be performed with the hacksaw.

Manually guided and supported power operated hacksaws are known and have been proposed but in most cases they are difficult to handle and to guide because of uneven distribution of the weight. Moreover the guiding of the reciprocating hacksaw frame can usually not be carried out with great precision as the guiding means consists solely in an elongated arm or the like provided with lugs and eyes through which the upper portion of the frame of the hacksaw passes. The hacksaw blade and the frame for supporting it is not supported near the saw blade in a satisfactory manner, thus producing vibrations and giving rise to great frictional resistance so that the cuts produced by the saw are lacking in evenness and precision.

It is an object of the invention to eliminate these disadvantages and to provide a saw of perfectly symmetric shape in which all parts of the mechanism are essentially balanced with respect to the plane of symmetry in which the saw is manually guided.

A further object of the invention consists in providing a friction reducing means and, in addition, guide means which hold and guide that portion of the frame between which the saw is stretched, these means being used in addition to guiding means on other portions of the frame so that the latter is perfectly guided on all sides.

These and further more specific objects will be described in detail in the following specification.

The invention is illustrated in the accompanying drawing showing one embodiment thereof by way of example. It is, however, to be understood that the embodiment which has been illustrated has been selected in order to be able to explain the principle of the invention and the best mode of carrying said principle into effect. However, the embodiment shown in the drawing is not the sole embodiment of the invention and a departure from the embodiment shown by way of example is therefore not necessarily a departure from the principle of the invention.

In the drawing:

Figure 1 is an elevational side view of the hacksaw according to the invention.

Figure 2 is an elevational sectional view of the hacksaw mechanism according to the invention, the section being taken along the plane of symmetry.

Figure 3 is a sectional elevational view, the section being taken along line 3—3 of Figure 2.

Figure 4 is a sectional elevational view, the section being taken along line 4—4 of Figure 2.

Figure 5 is a sectional elevational view, the section being taken along line 5—5 of Figure 2.

As will be seen from the figures the electrically driven manually guided hacksaw, according to the invention, comprises an outer housing or casing 10 which essentially consists of two sections, one of said sections, hereinafter called the front section, holding and housing the hacksaw frame and the saw blade while the other section, hereinafter called the rear section forms the handle and supports the electric drive mechanism. The housing or casing essentially consists of two side plates 11 and 11a, each provided with an upper flange 12 and with lower flanges 14, 15 which project inwardly.

The two side plates 11 and 11a are not identical; the side plate 11 covers both sections and therefore forms part of the housing surrounding the front section and of the casing or housing surrounding the rear section, while the side plate 11a (Figure 1) merely covers the housing surrounding the front section, the housing or casing forming the rear section being formed by a separate side plate 23. The upper flange 12 of the side plate 11 runs along the entire length of the said side plate and covers about half of the distance between the side plates 11 and 11a so that the ends of the flange are approximately located in the plane of symmetry of the housing. The flange 12 is faced by corresponding flanges 12' of the second side plate 11a and by a similar flange 12a of the separate side plate 23 covering the rear section of the housing.

Both side plates 11 and 11a have a deep middle recess 17 through which the saw blade runs which is exposed by these recesses. The lower flanges 14, 15 therefore project merely from those portions of the side plates 11, 11a which are located on both sides of the recess 17. The plate 23 of the rear section has a similar flange 14a projecting inwardly towards flange 14 of side plate 11.

Those portions of the side plates 11 and 11a from which upper and lower flanges project are U-shaped in cross section (Figures 3, 4 and 5).

The side plates 11 and 23 covering the rear section of the housing are provided near their rear ends with a hand slot 18 so arranged that merely a gripping strip 21 is left at the end. This gripping strip also forms a support for the electric motor 20 which may be mounted on said gripping strip 21 by means of small brackets 71.

This gripping strip 21 also carries a suitable switch 25, for instance a micro-switch, for connecting and disconnecting the motor 12 with a power outlet, a connecting cable 22 and plug connection being shown in the drawing. The switch 25 may be operated by a trigger lever 24, so arranged between the two side plates in the rear of hand slot 18 through which the hand is passed that one finger may rest on it and may actuate the lever 24, which may be pivoted to the gripping strip 21, when the said gripping strip is held by the hand of the operator. The operation of the trigger lever 24 operates the microswitch 25, and for this purpose the lever 24 may either be connected with a switch member or, as customary in connection with micro-switches may be in contact with the operating pin of the micro-switch which is pressed back when the lever 24 is pressed, thus operating the switch.

At the front and rear end of the front section of the housing 10 two guide plates 28, 30 are arranged respectively which guide plates are fixed to the flanged side plates by means of screws 31, 32, each guide plate preferably resting on or being applied against certain of flanges 12, 12', 12a, 15, 14, 14a.

The screws 31 and 32 connecting the guide plates and side plates also hold the two side plates 11, 11a of the housing together so that the latter forms a rigid unit. The separate plate 23 in the rear section of the housing is however held separately by means of a series of tubular threaded spacers 72 and screws 74 engaging said spacers and the side plates 23 and 11, respectively (Figure 5).

The guide plates 28, 30, are provided with grooves 33, 34, respectively, forming runways for rollers 36, 40 respectively, mounted on the frame plates 42, 43 of a saw frame 45, which frame plates are arranged at the ends of the frame 45 and are welded to the longitudinal frame member 46 so as to form a rigid and solid saw carrying frame.

As seen in Figures 3 and 4, the rollers 36, 40, respectively, are mounted on axles 48, 49 respectively, carried by the projecting ends of the plates 42, 43 which flank recesses 52, 54 provided at both ends of the frame plates. These frame plates also carry the bolts or stems 51, 53 respectively to which the saw blade 50 is attached. As customary, one of the stems 51 is provided with means for longitudinal adjustment of the saw blade tension, for instance, with a threaded bolt 55 engaging a nut 56 resting on a tubular socket 57 through which the stem may pass.

The other stem 53 may merely be provided with a head 57a which, in cooperation with the bolt and nut keeps the saw tensioned to the desired extent within the frame.

The rear frame plate 43 is moreover provided with a central bolt 60 projecting into a recess with suitably shaped divergent walls. The recess may either be provided on one side or in the center of the frame plate. The portion of the bolt 60 which projects into the recess 62 journals the end of a connecting rod 66 the other end of which is journaled on a pin 67 projecting from the side of a worm wheel 68 or from a disk attached thereto.

The pin 67 may be adjustable so that the stroke of the connecting rod and also the movement of the saw may be regulated. Usually, merely a change of position is necessary which is obtained by boring a plurality of threaded holes into the worm wheel or disk 68 into which the pin may be inserted.

The worm wheel is driven by a worm 70 on the shaft 69 of the electric motor 20.

Preferably the worm wheel is journaled on an axle 65 projecting from a boss 64 provided on the side plate extension 11.

When in use the saw is held with one hand by passing the hand through the slot 18 and gripping the portions 21 of the rear section of the casing, while the other hand holds the frame 10 to produce proper alignment or location of the saw on the work piece. When the saw is in its proper place the trigger 24 is pressed and with the hand on frame 10 applying some pressure, if desired, the hacksaw is now rapidly reciprocated thus producing the desired cut with great precision.

To mount or repair the worm wheel and other parts the plate 23 is removable by removing the screws 74. To change the saw blade it is preferable, although not absolutely necessary, to remove one side plate, preferably the side plate 11a of the housing 10.

It will thus be seen that the hacksaw according to the invention permits a practically frictionless and efficient mounting of an electrically driven saw blade which is suitable for high speed of reciprocation and thereby for a high number of revolutions of the electrical motor which consequently can be small and of light weight. As the operator is practically relieved from the cutting work proper he can concentrate on exact guiding of the blade, the movement of which is strictly limited to a plane.

It will also be seen that the arrangement is practically symmetrical all parts being located either in the plane of symmetry or at equal distance from the same so that guiding and manipulation is not impaired by unilateral distribution of weight.

It will be clear that unessential details of the construction may be changed without in any way departing from the essence of the invention as defined in the annexed claims.

What is claimed as new is as follows:

1. A power operated hand manipulated hacksaw, comprising a casing with a recess exposing a saw blade, divided into a first saw housing section and a second power drive carrying handle section, provided with gripping means, longitudinally grooved longitudinal guide plates at the ends of the saw housing section, a rigid saw frame carrying the blade and including saw frame plates arranged transversely in the casing at right angles to the saw blade, each plate being provided with a roller, running in the groove of a guide plate and blade reciprocating means including an electric motor and rotating transmission gear members mounted in the second section of the casing.

2. A power operated hand manipulated hacksaw as claimed in claim 1, wherein two grooved spaced parallel guide plates are provided at each end of the first section and wherein each saw frame plate is provided with two rollers, each roller running in the groove of one of the saw frame plates.

3. A power operated hand manipulated hacksaw as claimed in claim 1, wherein the casing consists of two flanged side plates of U-shaped cross-section at their ends, said side plates being held together by the guide plates extending between the side plates and fixed thereto.

4. A power operated hand manipulated hacksaw as claimed in claim 1, wherein one side plate covers both sections of the casing, while the other side plate covers only the first saw housing section, a further separate plate covering the second section, said second plate being separately mounted on the first plate.

5. A power operated hand manipulated hacksaw as claimed in claim 1, wherein one side plate covers both sections of the casing on one side, the other side of the casing being covered by two further separate side plates, one of said further side plates covering the first section of the casing and the other side plate covering the second section of the casing, and wherein the first named side plate covering both sections of the casing and the side plate covering the second section only are both slotted and provided with a gripping strip, the electric motor being mounted on said gripping strips, a switch controlling the current supply to the electric motor, a trigger lever operating said switch pivotally mounted on a gripping strip, the rotating transmission gear members being mounted in said second section between the side plates covering said section.

6. A power operated hand manipulated hacksaw as claimed in claim 5, wherein the transmission gear includes a connecting rod pivotally connected with one of the rotating transmission gear members and with the roller carrying saw frame plate at the end adjacent to the second section.

7. A power operated hand manipulated hacksaw as claimed in claim 1, wherein the electric motor and the rotating transmission gear members are arranged with their plane of symmetry coincident with the plane of symmetry of the casing and the plane of movement of the saw blade.

References Cited in the file of this patent

UNITED STATES PATENTS

| 1,556,547 | Ricard | Oct. 6, 1925 |
| 1,661,217 | Farrell | Mar. 6, 1928 |
| 2,596,481 | Hincks | May 13, 1952 |